No. 719,043. PATENTED JAN. 27, 1903.
T. REMINGER.
PIE TRIMMER.
APPLICATION FILED NOV. 3, 1902.
NO MODEL.
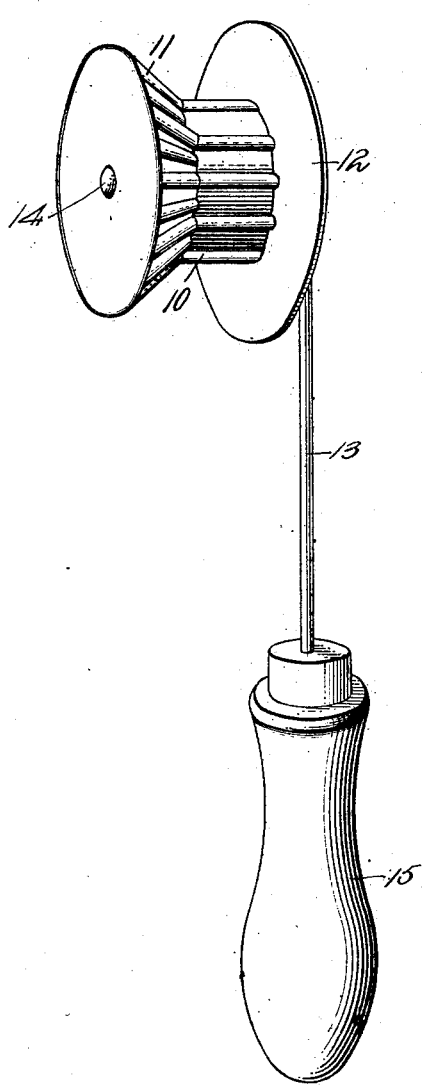
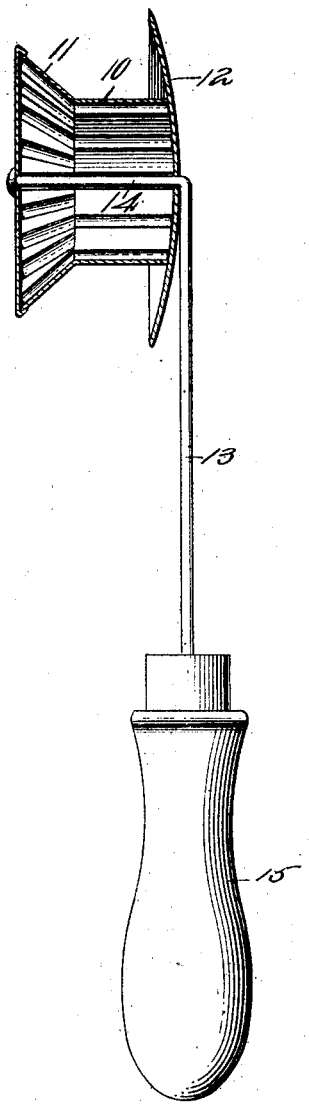
Witnesses
E. F. Stewart
C. K. Woodward
T. Reminger, Inventor:
by C. A. Snow & Co.
Attorneys

UNITED STATES PATENT OFFICE.

THEODORE REMINGER, OF NEW WASHINGTON, OHIO.

PIE-TRIMMER.

SPECIFICATION forming part of Letters Patent No. 719,043, dated January 27, 1903.

Application filed November 3, 1902. Serial No. 129,934. (No model.)

*To all whom it may concern:*

Be it known that I, THEODORE REMINGER, a citizen of the United States, residing at New Washington, in the county of Crawford and State of Ohio, have invented certain new and useful Improvements in Pie-Trimmers, of which the following is a specification.

This invention relates to devices employed in connection with pastry-cooking, and has for its object the construction of a simply-formed and easily-operated implement for the purpose of trimming and crimping pies and similar products; and the invention consists in certain novel features of construction, as hereinafter shown and described, and specified in the claims following.

In the drawings illustrative of the invention, Figure 1 is a perspective view of the implement complete. Fig. 2 is a sectional side elevation.

The implement may be made of any desired size and may be varied in shape to suit different sizes and forms of the product upon which it will be employed, and consists in a cylindrical portion 10, having a flaring flanged end 11, with the peripheries of these two portions provided with ornamental configurations of any desired design or fanciful shape. Attached to the opposite end of the cylindrical portion is a cutting-wheel 12, preferably convex toward the cylindrical portion and also preferably greater in diameter than the flanged end 11 and spaced therefrom, as shown. The cylindrical portion 10 and the flange 11 may be constructed integral and of wood or metal, as preferred, or partially of wood and partially of metal, the function of the parts 10 11 being to impart to the pie or other product the fanciful ornamental crimped outer edge, while the cutting-wheel 12 serves to trim the pie into symmetrical shape.

The handle member consists in the main stock or shank 13, with one end 14 bent at right angles to the shank and extended through the cutting-wheel 12 and the cylindrical portion 10 and forming the bearing therefor, the stock portion 13 being disposed in comparative close proximity to the outer side of the wheel 12, and thus preventing longitudinal movement of the cutting and crimping portion upon the handle member, the handle member being thus disposed at right angles to the axial line of the cylinder.

The handle member 13, with its journal portion 14 disposed at right angles thereto, thus serves not only as a support to the cutting and crimping portion of the device, but also as a stop to hold it in proper position relative to the handle member, and thereby secure their proper coaction. When thus constructed and arranged, a very convenient and easily-operated device is produced, which when placed upon the outer margin of a pie before it is baked, with the cutting-wheel in position against the edge of the plate and run around the latter, the cutting-wheel will remove the surplus dough and the portions 10 11 at the same time imprint upon the margin of the pie repeated impressions of the configurations upon their surfaces, as will be readily understood. The flanged portion 11, coacting with the cylindrical portion 10, produces a convex configuration to the margin of the pie and conforms more readily to its outlines, and thereby materially increases the effectiveness of the action and correspondingly increases the value of the invention. The flanged end 11 is therefore an important feature of the invention, adding materially to its effectiveness and crimping the dough which will form the upper crust more thoroughly into engagement with the dough which will form the lower crust and effectually preventing the leakage or overflow of the material making up the contents of the pie.

The implement thus disclosed makes a very effective easily constructed and operated device very simple in its action and enabling the pastry-cook to trim and crimp pies very expeditiously and uniformly and impart thereto a finished appearance. The stock portion 13 will be provided with a suitable grip member 15 to enable the operator to handle the device with precision and to hold the cutting-wheel in proper position relative to the edge of the pie-plate.

The device may be employed for a variety of purposes in connection with pastry-cooking and for other domestic purposes.

Having thus described the invention, what is claimed is—

1. An implement for marking and trimming pies and the like consisting in a cylindrical portion flanged upon one end and having peripheral marking configurations and provided with a cutting-wheel upon the other end, in combination with a handle member disposed at right angles to the axial line of the cylinder and its cutting-wheel, and transversely extended to form a journal therefor and to limit the longitudinal movement thereof.

2. An implement for marking and trimming pies and the like consisting in a cylindrical portion provided with a flanged outer end and having peripheral marking configurations said cylindrical portion being provided with a convex cutting-wheel upon the other end, in combination with a handle member disposed at right angles to the axial line of the cylinder and its cutting-wheel and transversely extended to form a journal therefor.

In testimony that I claim the foregoing as my own I have hereto affixed my signature in the presence of two witnesses.

THEODORE REMINGER.

Witnesses:
H. M. CORY,
W. H. KNIGHT.